(12) United States Patent
Chen

(10) Patent No.: US 6,557,701 B1
(45) Date of Patent: May 6, 2003

(54) HANGABLE STORAGE CONTAINER FOR STORING A COMPACT DISK

(76) Inventor: Cheng-Sung Chen, No. 380, Chung-Hua Rd., Tou-Liu City, Yun-Lin Hsien (TW)

( * ) Notice: Subject to any disclaimer, the term of this patent is extended or adjusted under 35 U.S.C. 154(b) by 0 days.

(21) Appl. No.: 10/086,052

(22) Filed: Feb. 28, 2002

(51) Int. Cl.7 .............................................. B65D 85/57
(52) U.S. Cl. ................................... 206/308.7
(58) Field of Search .............................. 206/308.1, 311, 206/312, 313, 806, 449; 40/340, 359, 360; 402/70, 73, 79, 4, 17; 281/15.1, 21.1, 29, 38, 43; 312/184; 229/67.2; 211/42

(56) References Cited

U.S. PATENT DOCUMENTS

| | | | | |
|---|---|---|---|---|
| 3,572,867 A | * | 3/1971 | Cooper | 312/184 |
| 3,865,445 A | * | 2/1975 | Dean et al. | 312/184 |
| 3,957,321 A | * | 5/1976 | Rose | 312/184 |
| 5,396,987 A | * | 3/1995 | Temple et al. | 206/309 |
| 5,993,099 A | * | 11/1999 | Greenberg et al. | 402/4 |
| D419,358 S | * | 1/2000 | Marcon | D6/626 |
| D426,099 S | * | 6/2000 | Udwin et al. | D6/626 |
| 6,186,320 B1 | * | 2/2001 | Drew | 206/308.1 |

* cited by examiner

Primary Examiner—Shian Luong
(74) Attorney, Agent, or Firm—Ladas & Parry

(57) ABSTRACT

A hangable storage container for a compact disk includes first and second flexible sheets forming a pocket, and a third flexible sheet folded to have two halves and attached to a mounting area of the first flexible sheet to confine a passage for receiving two hook bars. The hook bars are slidable along the passage between a retracted position where anchoring ends thereof are disposed in the passage, and an extended position where the anchoring ends extend outwardly of the passage so as to be held by two anchoring supports for hanging the storage container in an upright state.

7 Claims, 5 Drawing Sheets

HANGABLE STORAGE CONTAINER FOR STORING A COMPACT DISK

BACKGROUND OF THE INVENTION

1. Field of the Invention

This invention relates to a storage container for storing a compact disk, more particularly to a hangable storage container which can be anchored on two parallel supports in an upright position.

2. Description of the Related Art

Referring to FIG. 1, a conventional storage container 1 for a compact disk 2 is shown to include a rectangular sheet 11 comprised of a non-woven fabric for contacting an optical surface of the compact disk 2, and a transparent front sheet 12 disposed over and joined to the non-woven fabric by heat-sealing three peripheral edges thereof so as to form a pocket 14 that is accessible along a non-joined edge 141. A binding portion 13 is formed on one of the joined peripheral edges and has a plurality of binder holes 131 so as to secure the storage container 1 in a ring binder (not shown).

Although a plurality of the storage containers 1 can be stacked and stored in a ring binder, it is inconvenient to search and retrieve a desired compact disk from a stack of the storage containers 1.

SUMMARY OF THE INVENTION

The object of the present invention is to provide a hangable storage container which can be anchored on two parallel supports in an upright position so as to facilitate storage in a box container and searching of a desired compact disk therefrom.

According to this invention, the hangable storage container includes a first flexible sheet with a major wall which has a storage area and a mounting area opposite to each other in a longitudinal direction. A second flexible sheet is attached to the storage area to form a pocket which has an access opening and which is adapted to receive a compact disk via the access opening. A third flexible sheet is folded to have front and rear halves which are spaced apart from each other in a first direction transverse to the longitudinal direction, and which are attached to the mounting area distal to the storage area to confine a passage that extends in a second direction transverse to both the first direction and the longitudinal direction and that terminates at left and right insert ends. Elongated left and right hook bars are inserted into the passage from the left and right insert ends. Each hook bar has an anchoring end which is adapted to be held by an anchoring support, and a blocking end which is opposite to the anchoring end and which is disposed inwardly of the left and right insert ends. The hook bars are slidable in the second direction between a retracted position, where the anchoring ends are respectively closer to the left and right insert ends, and an extended position, where the anchoring end are respectively remote from the left and right insert ends for anchoring on the anchoring supports to place the storage container in an upright position. Left and right retaining members are disposed in the passage to respectively hinder further movement of the blocking ends towards the left and right insert ends respectively in the extended position.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
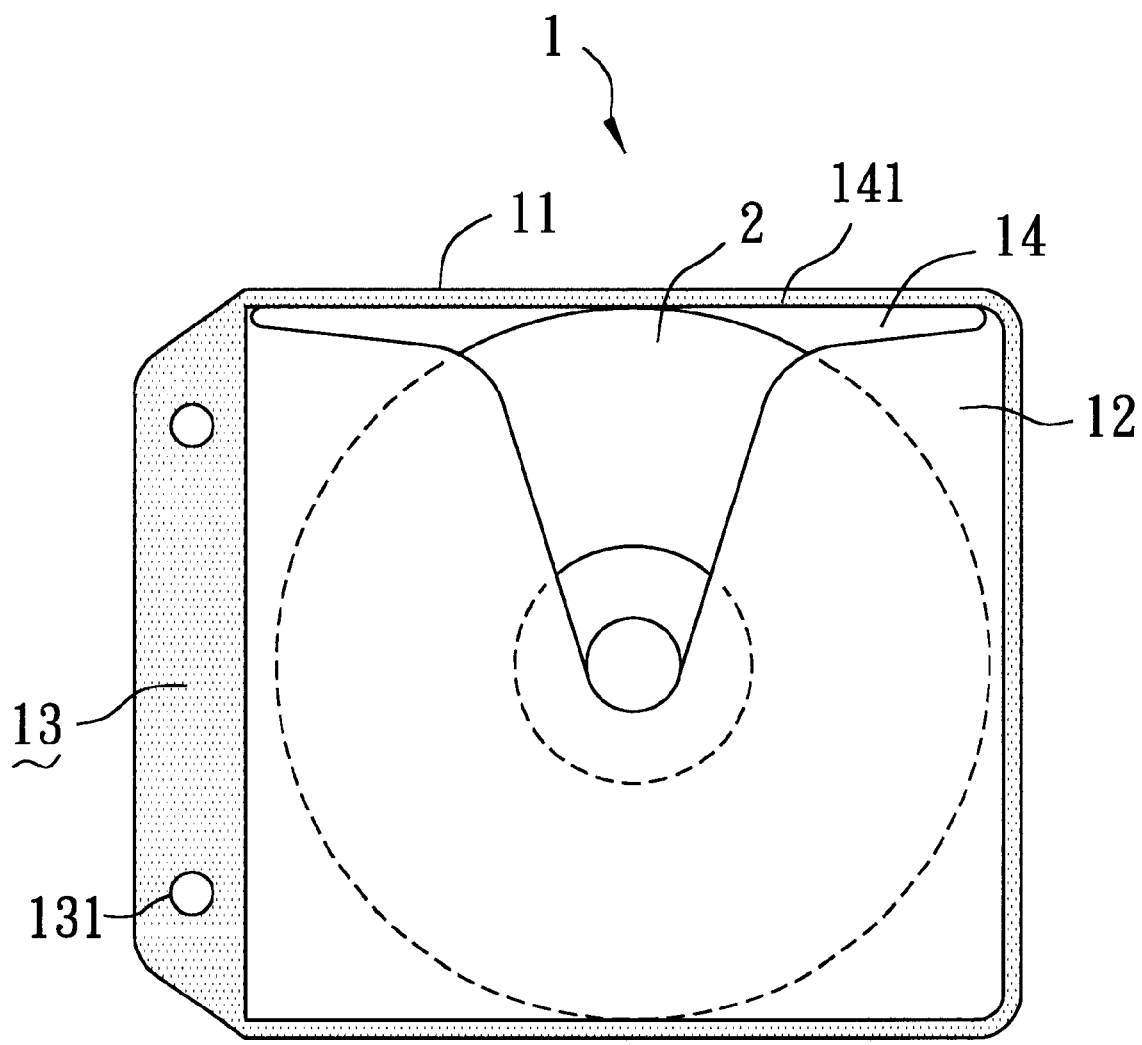
FIG. 1 is a front view of a conventional compact disk storage container.
Figure 2:
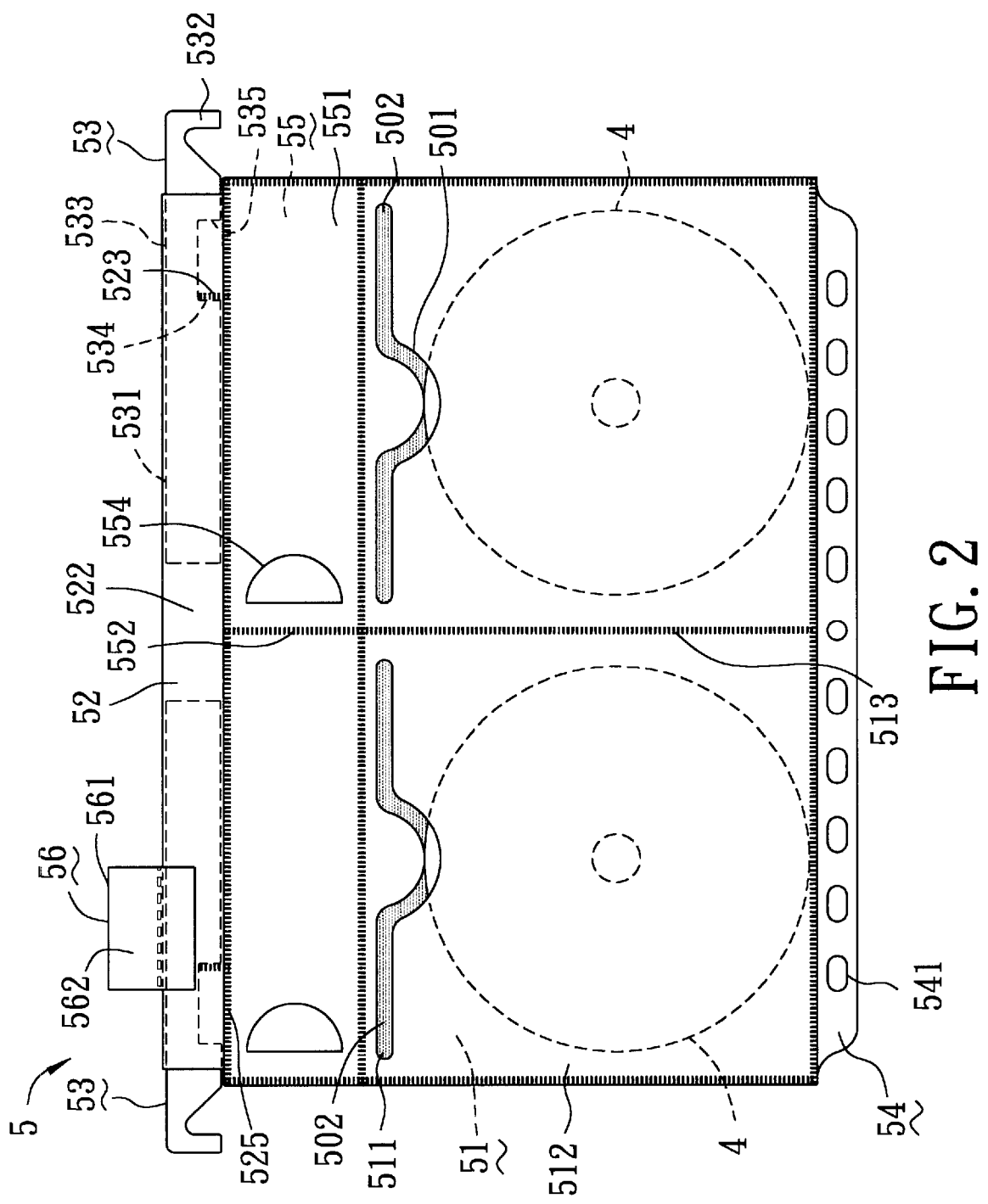
FIG. 2 is a front view of a preferred embodiment of a hangable storage container according to this invention.
Figure 3:
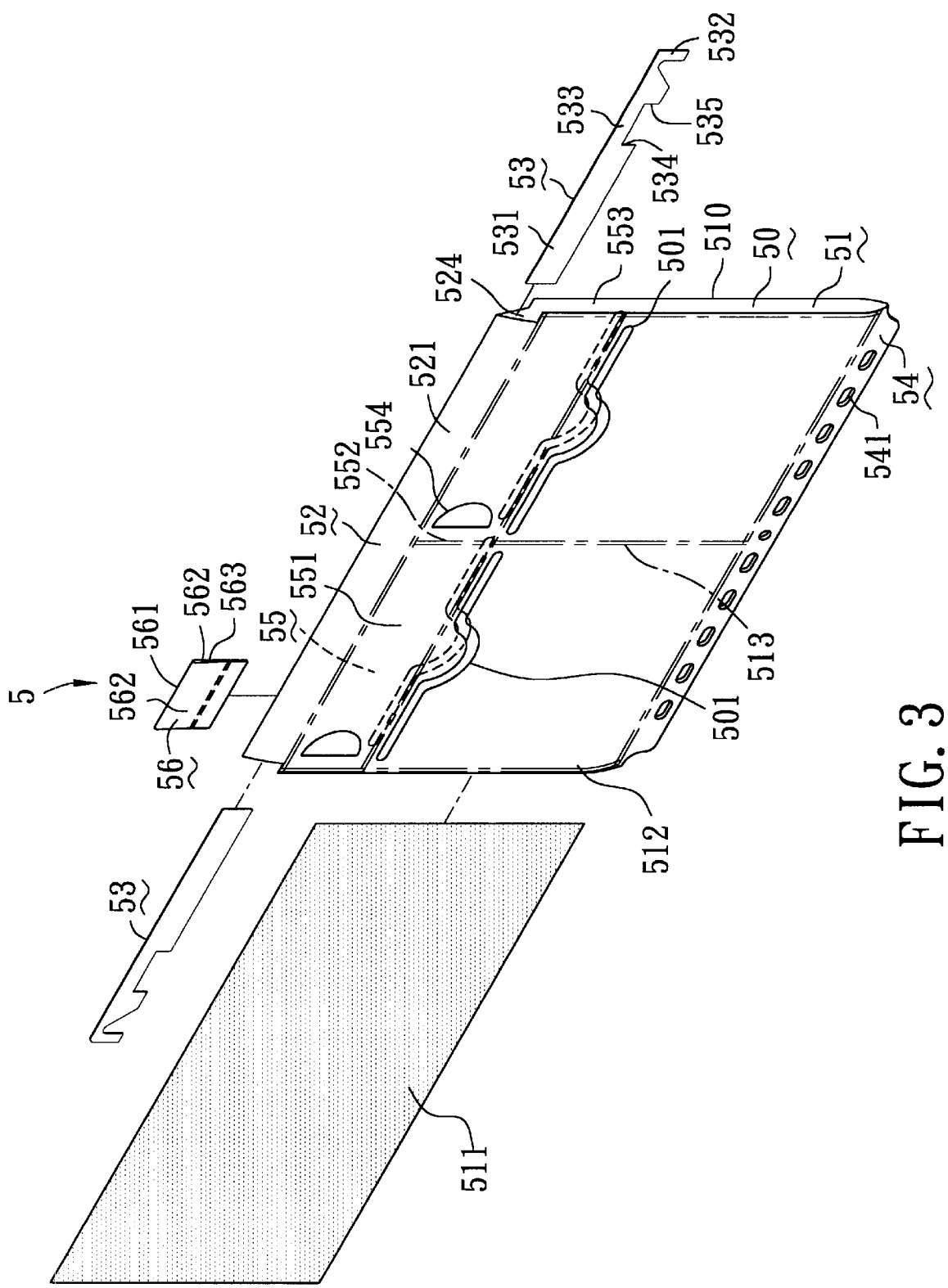
FIG. 3 is an exploded perspective view of the preferred embodiment.
Figure 4:
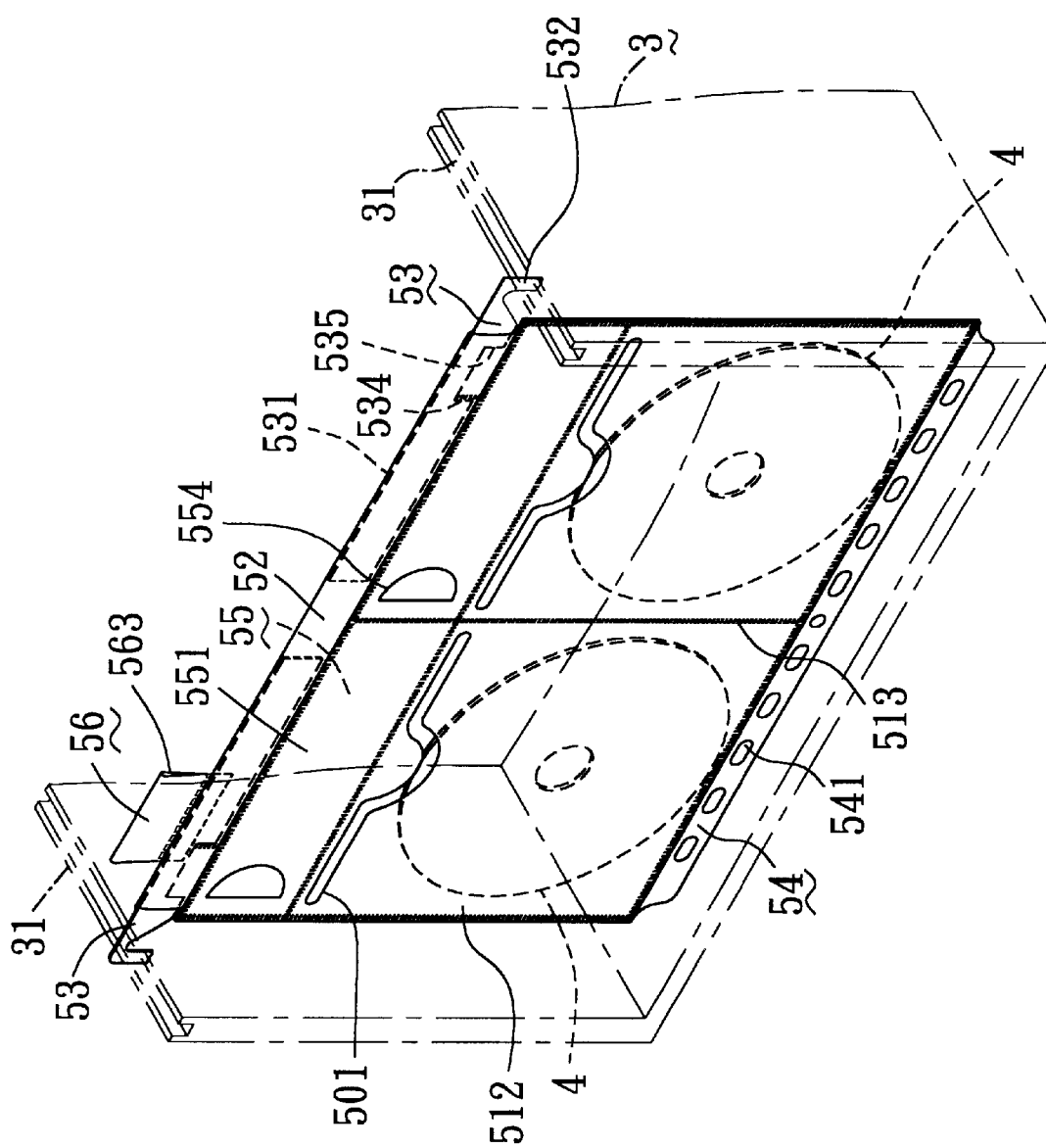
FIG. 4 is a perspective view of the preferred embodiment when held on two rails of a drawer.

Referring to FIGS. 2, 3, and 4, the preferred embodiment of the hangable storage container 5 according to the present invention is shown to comprise a plastic first flexible sheet 510 which includes a major wall with a storage area 51 and a mounting area opposite to each other in a longitudinal direction. A plastic second flexible sheet 512 is attached to the storage area 51 to form a pocket 50. A non-woven fabric sheet 511 is disposed between and is joined to the storage area 51 and the second flexible sheet 512 by heat-sealing at three peripheral edges thereof. A heat-seal partition line 513 joins the first and second flexible sheets 510,512 and the non-woven fabric sheet 511 so as to divide the pocket 50 into two pocket spaces 502. The second flexible sheet 512 is formed with two access openings 501 for access into the pocket spaces 502 such that two compact disks 4 can be received in the pocket spaces 502 via the access openings 501.

A plastic third flexible sheet 52 is formed integrally with the mounting area of the first flexible sheet 510 distal to the storage area 51, and is folded to have front and rear halves 521 which are spaced apart from each other in a first direction transverse to the longitudinal direction and which are heat-sealed to the mounting area by a longitudinally extending first seal line 525 to confine a passage 522 that extends in a second direction transverse to both the first direction and the longitudinal direction and that terminates at left and right insert ends 524.

The hangable storage container 5 of this embodiment further comprises elongated left and right hook bars 53. Each hook bar 53 has an anchoring end 532 which can be held by an anchoring support, such as a rail 31 on an upright side wall of a drawer 3, and a blocking end 531 opposite to the anchoring end 532. The left and right hook bars 53 are disposed to be inserted in the passage 522 such that the anchoring ends 532 can be respectively disposed outwardly of the left and right insert ends 524, and such that the blocking ends 531 extend respectively and inwardly of the left and right insert ends 524. The left and right hook bars 53 are slidable in the second direction between a retracted position, where the anchoring ends 532 are respectively retracted in the passage 522, and an extended position, where the anchoring ends 532 project respectively and outwardly of the left and right insert ends 524 for anchoring on the rails 31. In addition, the blocking end 531 is formed with a notched portion 533 adjacent to the anchoring end 532, and distal and proximate abutting edges 534,535 relative to the anchoring end 532.

Left and right retaining members include two second seal lines 523 which join the front and rear halves 521 and which extend from the first seal line 525. As such, when the right and left hook bars 53 are moved from the retracted position to the extended position, the distal abutting edges 534 can abut against the second seal lines 523 respectively so as to hinder further movement of the blocking ends 531. Moreover, the proximate abutting edges 535 can abut against the second seal lines 523 respectively so as to hinder further movement of the blocking ends 531 when moved from the extended position to the retracted position.

Thus, by means of the right and left hook bars 53, the storage container 5 according to this invention can be held by two rails 31 or anchoring supports of a drawer 3 or a box container in an upright position for facilitating searching of a desired compact disk.

A plastic fourth flexible sheet 551 is attached to the mounting area between the second and third flexible sheets 512,52 in the longitudinal direction to form a first label receiving space 55. A heat-seal partition line 552 is disposed to divide the first label receiving space 55 into two label receiving chambers 553. Two openings 554 for access into the label receiving chambers 553 such that two identifying labels (not shown) can be received in the label receiving chambers 553 to facilitate identification of the compact disks 4.

In addition, a tab 56 is heat-sealed on and extends from the third flexible sheet 52 in the longitudinal direction, and has a folding line 561 to form two tab halves 562 and a second label receiving space 563 between the tab halves 562.

Figure 5:
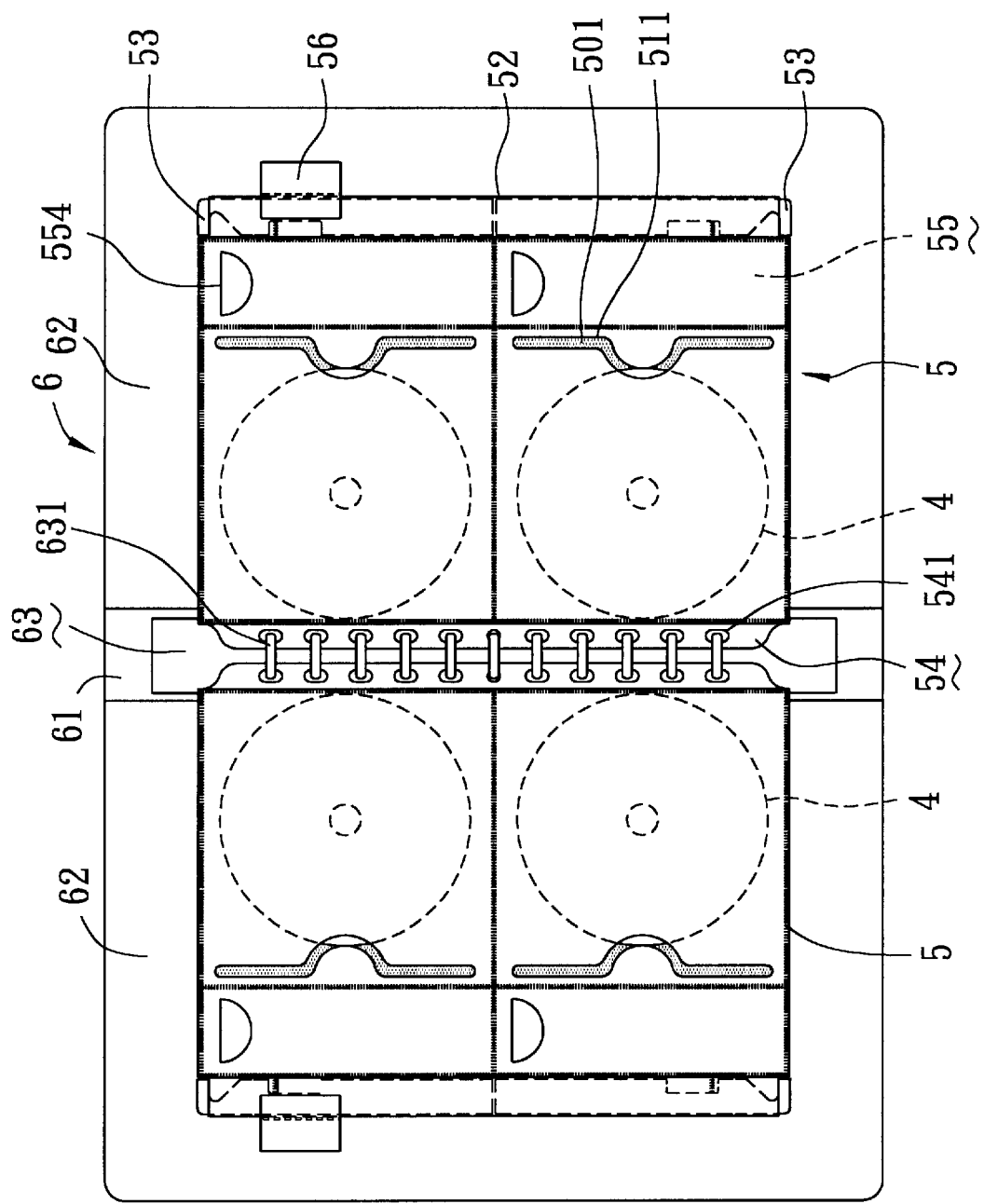
FIG. 5 is a front view showing how a plurality of the storage containers of FIG. 2 are placed in a ring binder.

With reference to FIG. 5, a binding portion 54 is attached to the storage area 51 at a sealed peripheral edge remote from the third flexible sheet 52 in the longitudinal direction, and has a plurality of binder holes 541. Thus, a known ring binder 6 can be used to store a plurality of the hangable storage containers 5 of this invention. The binder 6 includes a spine portion 61, two covers 62, and a binding member 63 with binding rings 631 which can pass through the binder holes 541 to bind the storage containers 5 between the covers 62.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A hangable storage container for storing a compact disk, comprising:

a first flexible sheet including a major wall which has a storage area and a mounting area opposite to each other in a longitudinal direction;

a second flexible sheet attached to said storage area to form a pocket which has an access opening and which is adapted to receive the compact disk via said access opening;

a third flexible sheet folded to have front and rear halves which are spaced apart from each other in a first direction transverse to the longitudinal direction, and which are attached to said mounting area distal to said storage area to confine a passage that extends in a second direction transverse to both the first direction and the longitudinal direction and that terminates at left and right insert ends;

elongated left and right hook bars, each having an anchoring end adapted to be held by an anchoring support, and a blocking end opposite to said anchoring end, said left and right hook bars being disposed to be inserted in said passage such that said anchoring ends of said left and right hook bars are respectively disposed outwardly of said left and right insert ends, and such that said blocking ends of said left and right hook bars extend respectively and inwardly of said left and right insert ends, said left and right hook bars being further disposed to be slidable in the second direction between a retracted position, where said anchoring ends are respectively closer to said left and right insert ends, and an extended position, where said anchoring ends are respectively remote from said left and right insert ends; and left and right retaining members disposed in said passage to respectively hinder further movement of said blocking ends towards said left and right insert ends respectively in the extended position.

2. The hangable storage container of claim 1, wherein said third flexible sheet is made from a heat-sealable material and is formed integrally with said mounting area, said front and rear halves being heat sealed to each other and having a first seal line extending in the second direction, thereby confining said passage.

3. The hangable storage container of claim 2, wherein each of said left and right retaining members includes a second seal line disposed to join said front and rear halves and extending from said first seal line in the longitudinal direction, and an abutting edge disposed on said blocking end and abutting against said second seal line when a respective one of said left and right hook bars is in the extended position.

4. The hangable storage container of claim 1, further comprising a binding portion attached to said storage area remote from said mounting area in the longitudinal direction and extending in the second direction, said binding portion having a plurality of binder holes adapted for engaging a ring binder.

5. The hangable storage container of claim 1, further comprising a fourth flexible sheet attached to said mounting area between said second and third flexible sheets in the longitudinal direction to form a label receiving space, and having an opening to access to said label receiving space.

6. The hangable storage container of claim 1, further comprising a tab disposed on and extending from said third flexible sheet in the longitudinal direction away from said storage area, and having a second label receiving space confined therein.

7. The hangable storage container of claim 1, further comprising a non-woven fabric sheet disposed between said storage area and said second flexible sheet in the first direction.

* * * * *